United States Patent Office 3,527,051
Patented Sept. 8, 1970

3,527,051
FUEL CONTROL
Charles F. Stearns, East Longmeadow, Mass., and Louis A. Urban, Granby, Conn., assignors to United Aircraft Corporation, East Hartford, Conn., a corporation of Delaware
Filed Apr. 15, 1968, Ser. No. 721,329
Int. Cl. F02c 9/10, 7/08
U.S. Cl. 60—39.28
8 Claims

ABSTRACT OF THE DISCLOSURE

A fuel control utilizes power plant speed, inlet air temperature, inlet air pressure and combustion section inlet temperature as parameters for scheduling the acceleration of the power plant within surge and over temperature limits; the control utilizes combustion section temperature rise, compressor inlet pressure and power lever setting for scheduling fuel flow during steady state operation; and during deceleration the control utilizes compressor inlet temperature, compressor inlet pressure and power plant speed as parameters for scheduling the fuel flow.

BACKGROUND OF THE INVENTION

Field of the invention

This invention relates to fuel controls and particularly to fuel controls for a gas turbine type power plant.

Description of the prior art

In the course of the development of fuel controls for gas turbine engines, many attempts have been made to select parameters which are indicative of the operation of the jet engine in order to control the acceleration and steady state operating modes of the power plants in the most efficient and economical manner. With the use of heretofore known parameters the present day fuel controls are considered complex, requiring a considerable number of components, many of which are expensive to manufacture, assemble and calibrate. The schedule control parameter which has found extensive use in the one described in Pat. No. 2,882,666, granted to S. Best. This patent teaches the type of fuel control that is indicative of the present day state of the art where fuel flow to the engine burner is scheduled as a function of $W_f/P$.

A characteristic basic to the $W_f/P$ parameter that accounts for its limited applicability is that in order to limit turbine inlet temperature during acceleration of the engine, the control must generate a schedule signal that assumes that combustion section inlet temperature is known as a function of engine speed and an engine inlet temperature, and the best known manner of scheduling acceleration has been by the utilization of a three-dimensional cam.

This use of a schedule $W_f/P$ is not always a valid assumption and is particularly not true of regenerative or recuperative engines during transient operation. This invention relates to an open loop scheduling fuel control which precisely accounts for the effect of burner inlet temperature on fuel flow required for surge or over temperature avoidance, and incidentally results in the elimination of the complex three-dimensional cam. The theory and operation of the present invention results in a simplified control mechanism and affords other advantages which will be apparent from the description to follow.

SUMMARY OF THE INVENTION

It is an object of this invention to provide an improved fuel control for precisely controlling the acceleration, deceleration and steady state operation of a gas turbine type power plant, which utilizes certain power plant conditions as control parameters which have not, heretofore, been used for this purpose.

Another object of the present invention is to provide a fuel control which is readily adaptable for control of turbo-jets, turbo-prop jets, and which has a special utility in the control of regenerative type jet power plants, either of the solid spool type or of the free turbine type.

Another object of the present invention is to provide a fuel control which is adaptable for control of gas turbine power plants utilized for propelling aircraft, land vehicles, and ships.

In accordance with the present invention, the above-objects are achieved by fuel control utilizing power plant speed, inlet air temperature, inlet air pressure, and combustion section (herein also called burner) inlet temperature as parameters for scheduling the acceleration of the power plant within surge and over temperature limits. The mode of control disclosed herein accounts for the interrelationship between the fuel flow and the above mentioned engine parameters in a theoretically precise manner and thus allows the user to take full advantage of the thermodynamic potential of the engine.

In further accord with the present invention, the use of the above-mentioned parameters provides a unique way of computing required fuel flow that accounts for the affects of ambient, engine, and regenerator outlet condition variations in a theoretically precise manner, and at the same time can result in a fuel control which is easy to execute in mechanical hardware.

To more fully appreciate the use of these control parameters, it is necessary to understand that surge and turbine inlet temperature can be uniquely related to the above-mentioned parameters. These unique relationships are shown in the following discussion in which these symbols are used:

| Symbol | Description | Units |
| --- | --- | --- |
| A ( ) | Area of various restrictions | in.² |
| f ( ) | Function of ( ) | |
| K | Various constants | |
| N | Power plant speed | R.p.m. |
| PLA | Power Lever Angle | Degree. |
| P ( ) | Various pressures | P.s.i. |
| $q_f$ | Heating valve of fuel | B.t.u./# |
| T ( ) | Temperature at station ( ) | °R. |
| $W_a$ | Air flow | #/sec. |
| $W_f$ | Fuel flow | #/hr. |
| cp | Specific heat | B.t.u./#-°R. |
| δ1 | Corrected inlet pressure $P_1/14.7$ p.s.i. | |
| Δ | Change | |
| $\Delta H_B$ | Total heat released in burners | B.t.u./hr. |
| $\eta_b$ | Burner efficiency | |
| $\theta_1$ | Corrected inlet temperature $T_1/(°R)/519$ | |
| ∝ | Proportional to | | when applied to pressures or temperatures:

Subscript 1—engine inlet
Subscript 3—compressor outlet
Subscript 4—regenerator outlet (combustion section inlet)
Subscript 5—turbine inlet The fundamental equation expressing the total heat released in the burner is:

(1) $$\Delta H_b = W_f \eta_b q_f = 3600 W_a C_p \Delta T_b$$

which may be written as (2) $$W_f = W_a \left[\frac{3600 C_p}{\eta_b q_f}\right] \Delta T_b = W_a K_1 (T_5 - T_4)$$

This may be written in its corrected, or referred, form as $$(3) \quad \frac{W_f}{\delta_1\sqrt{\theta_1}} = \frac{W_a\sqrt{\theta_1}}{\delta_1} K_1 \left(\frac{T_5}{\theta_1} - \frac{T_4}{\theta_1}\right)$$

During the surge limited portion of an acceleration, corrected air flow $$W_a\sqrt{\theta_1}/\delta_1$$

and corrected turbine inlet temperature $T_5/\theta_1$ are both known, from the compressor map (see FIG. 3.) as unique functions of $N/\sqrt{\theta_1}$ (see FIG. 4 and FIG. 5).

Equation 3 may thus be rewritten as $$(4) \quad \frac{W_f}{\delta_1\sqrt{\theta_1}\left(\frac{T_5}{\theta_1} - \frac{T_4}{\theta_1}\right)} = K_1 \frac{W_a\sqrt{\theta_1}}{\delta_1} = f_1\left(\frac{N}{\sqrt{\theta_1}}\right)$$

To accomplish surge limited accelerations, it thus becomes necessary only to schedule $$\frac{W_f}{\delta_1\sqrt{\theta_1}\left(\frac{T_5}{\theta_1} - \frac{T_4}{\theta_1}\right)}$$

as a unique function of $N/\sqrt{\theta_1}$ (see FIG. 6), and to multiple the scheduled value of the parameter by actual $P_1$, actual $\sqrt{\theta_1}$, and $$\left(\frac{T_5}{\theta_1} - \frac{T_4}{\theta_1}\right)$$

to arrive at the proper burner fuel flow. The last term is calculated from desired $T_5/\theta_1$ (see FIG. 5) and measured $T_4/\theta_1$.

Restating Equation 3:

$$(5) \quad \frac{W_f}{\delta_1\sqrt{\theta_1}} = \frac{W_a\sqrt{\theta_1}}{\delta_1} K_1\left(\frac{T_5}{\theta_1} - \frac{T_4}{\theta_1}\right)$$

Considering the turbine inlet temperature limited portion of an acceleration, Equation 5 may be rewritten as:

$$(6) \quad \frac{W_f\sqrt{\theta_1}}{\delta_1(T_5 - T_4)} = K_1 \frac{W_a\sqrt{\theta_1}}{\delta_1}$$

By definition, desired $T_5$ is a constant, and from the compressor map (FIG. 3) it can be seen that $$\frac{W_a\sqrt{\theta_1}}{\delta_1}$$

is a function of $N\sqrt{\theta_1}$ with a weak $\theta_1$ bias (see FIG. 7).

Equation 6 may therefore be written as:

$$(7) \quad \frac{W_f\sqrt{\theta_1}}{\delta_1(K_2 - T_4)} = f_2\left(\frac{N}{\sqrt{\theta_1}}\right) \cdot f_1(\theta_1)$$

The dominant $\sqrt{\theta_1}$ and the weak $f_1(\theta_1)$ biases may be combined in one multiplier and Equation 7 rewritten as:

$$(8) \quad \frac{W_f\theta_1^y}{\delta_1(K_2 - T_4)} = f_2\left(\frac{N}{\sqrt{\theta_1}}\right)$$

To accomplish temperature limited accelerations it thus becomes necessary only to schedule $$W_f\theta^y_1/\delta_1(K_2 - T_4)$$

as a unique function $N/\sqrt{\theta_1}$ (see FIG. 8), and to multiply the scheduled value of the parameter by actual $\delta_1$, actual $1/\theta^y_1$ and $(K_2 - T_4)$ to arrive at the proper burner fuel flow. The last term is calculated from $T_5$ desired $= K_2$ and measured $T_4$.

As embodied in the control schematic FIG. 2, completely safe and precise acceleration is obtained regardless of ambient temperature, engine speed, or regenerator conditions by comparing the surge and temperature limited desired $W_f/\delta_1$ signals and sending the lower of the two demand signals to the throttle valve. When the fuel flow ($W_f/\theta_1$), as biased by regenerator outlet conditions, reaches the level called for by the power lever, the power lever takes command of the throttle valve through another "least" selector and permits the engine to run in steady state.

The foregoing and other objects, features, and advantages of the present invention will become more apparent in light of the following detailed description of a preferred embodiment thereof, as illustrated in the accompanying drawings.

DESCRIPTION OF THE PREFERRED EMBODIMENT

Figure 1:
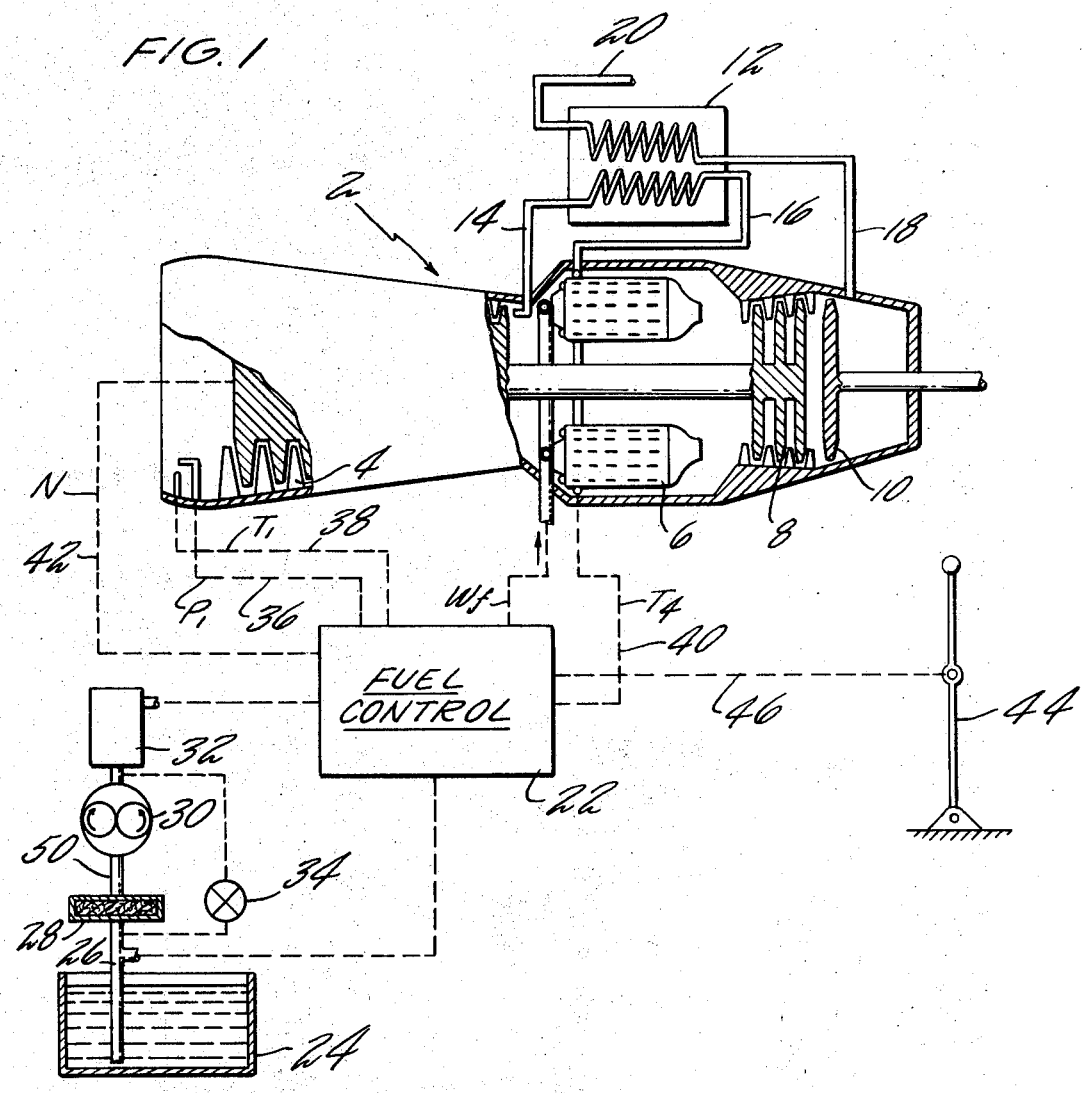
FIG. 1 is a schematic illustration of a gas turbine type power plant particularly showing the various sensing lines of the fuel control mechanism.

Referring to FIG. 1, there is shown a regenerative type turbine power plant indicated by numeral 2, comprising a compressor section 4, a burner 6, and a turbine section 8, receiving the exhaust gases discharging from the burner 6 for driving the compressor 4 and a power turbine 10. A heat exchanger 12 schematically illustrates a type of regenerative system and serves to place the incoming air to the burner 6 in heat exchange relation with the exhaust gases discharged from the turbine section 8. For this purpose a conduit 14 admits compressor discharge air into the heat exchanger 12 and delivers it to the burner 6 through a conduit 16, while a conduit 18 admits turbine section exhaust gases into the heat exchanger 12 and discharges them through a conduit 20 to the atmosphere.

The fuel control, generally illustrated by numeral 22, serves to meter fuel from a fuel source 24 to the burner 6 through a conduit 26. Disposed in the conduit 26 between the fuel source 24 and the fuel control 22 is a coarse filter 28, a pump 30 to pressurize the fuel, and a fine filter 32. A relief valve 34 is also provided across the pump in case of overpressurization of the fuel. As will be more fully illustrated hereinafter, the fuel control 22 receives several signals indicative of the parameters selected to compute the desired amount of fuel necessary to obtain optimum operation. For this purpose, the fuel control 22 senses the compressor inlet pressure via line 36, compressor inlet temperature via line 38, burner inlet temperature via line 40, and speed of the power plant via line 42. A power lever 44 is connected, via line 46, to fuel control 22 and is mounted available to the operator of the engine, whether it be utilized for propelling an aircraft, a ship, or a land vehicle, as the case may be, and the terminology "power lever," is tended to cover any linkage connecting the control area of the aircraft, ship, or land vehicle to the fuel control whether it be referred to as a "power lever," a "foot pedal," a "throttle lever" or the like. Furthermore, it is to be understood that the use of the regenerative type of turbine engine is shown merely for illustrative purposes, and the illustration is not to be considered a limitation on our invention.

As will be obvious to one skilled in the art, this concept is equally applicable to control straight jets, turbo-jets, and regenerative-type jet power plants, either of the solid spool type or of the free turbine type. It will be appreciated that our invention is particularly adaptable to a regenerator type of power plant; it is preferable in that case, to sense the burner inlet temperature at the outlet of the regenerator 12 as shown. In the case of a non-regenerative engine, the control would sense the burner inlet temperature at the compressor outlet.

Figure 2:
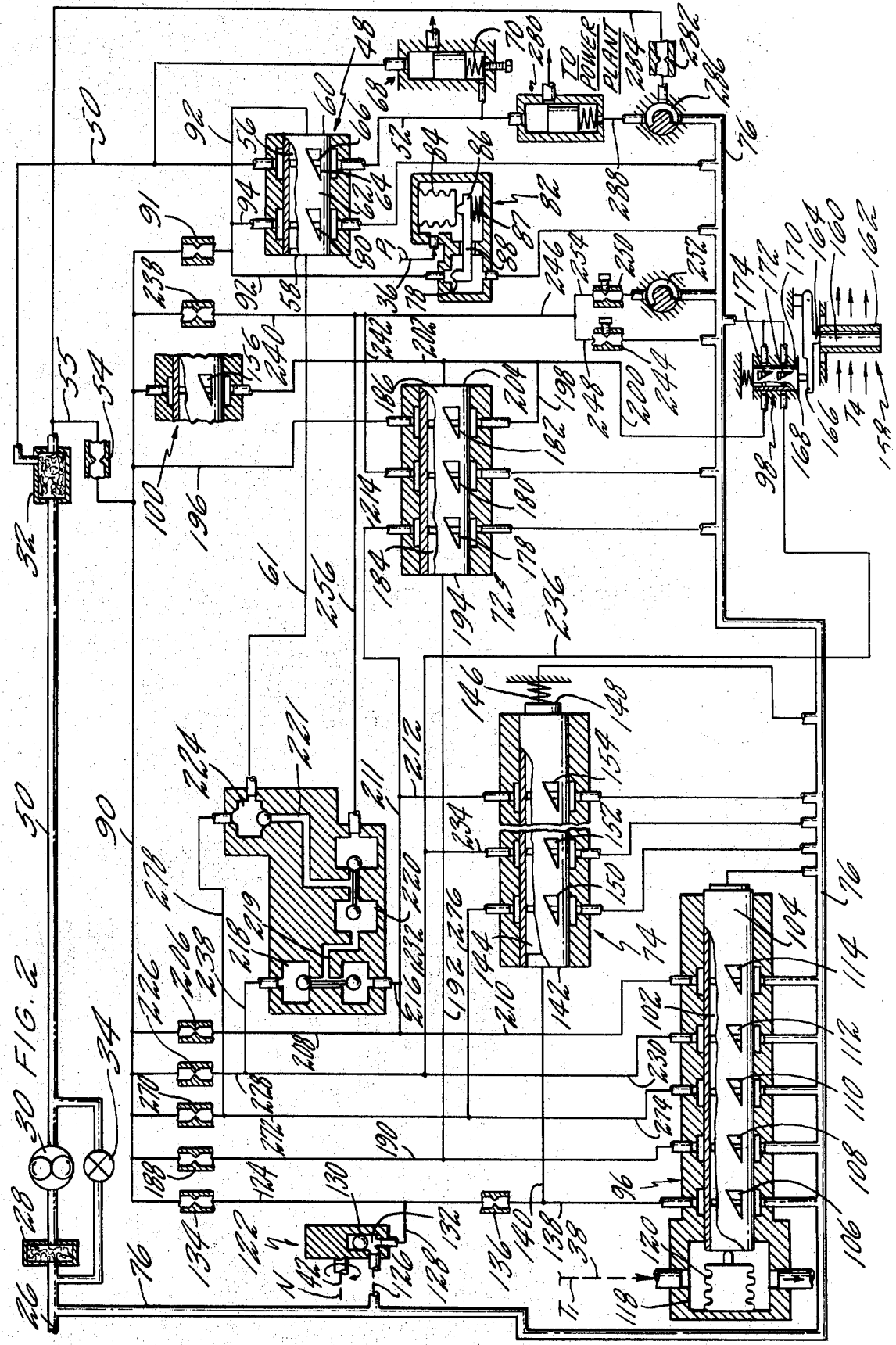
FIG. 2 is a schematic illustration showing a fuel control in accordance with the present invention.
Figure 3:
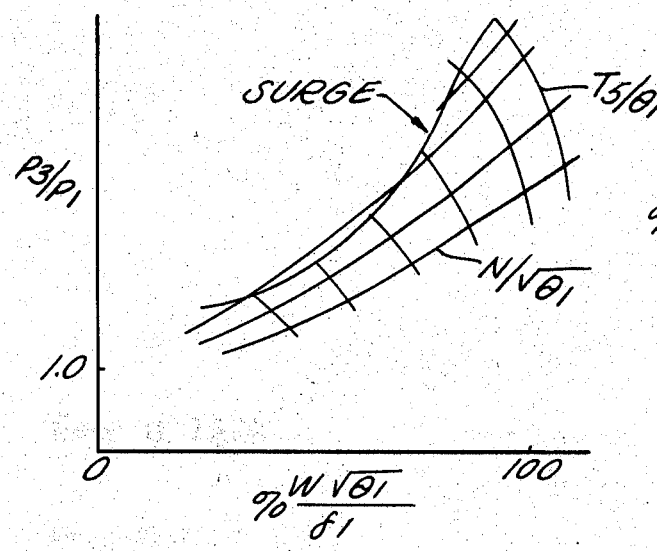
FIG. 3 is a typical "compressor map."
Figure 4:
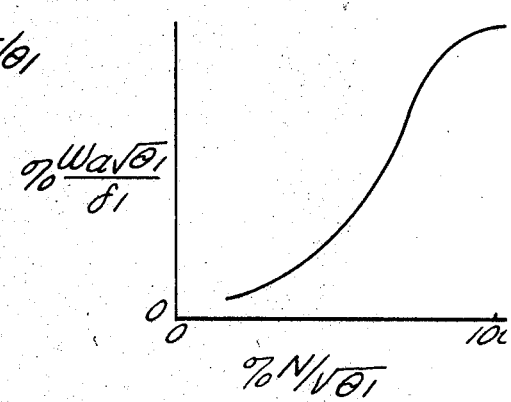
FIG. 4 is a graphical illustration of the relationship between corrected air flow and corrected engine speed for surge limited acceleration.
Figure 5:
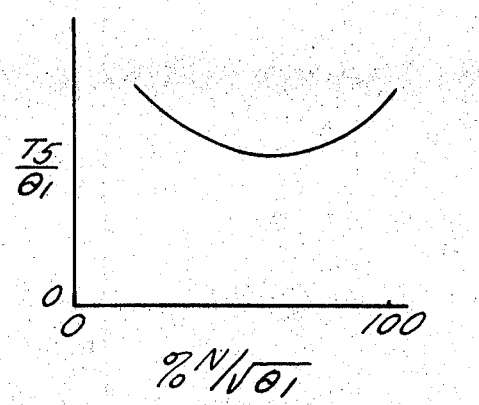
FIG. 5 is a graphical illustration of the relationship between the corrected turbine inlet temperature and corrected engine speed for surge limited acceleration.

Referring now to FIG. 2 (it will be understood that like numerals reference like parts in the various drawings), fuel is admitted to throttle valve 48 via conduit 50 from whence it is metered to the engine via conduit 52. Restriction 54 is a dropping orifice in line 55 which serves to minimize flow through, and to reduce the pressure level in the computing networks. Throttle valve 48 comprises spool 56 having its ends 58 and 60 subjected to metered pressures for positioning the spool or cylinder 62. Metering window 64 and cylinder 62 cooperates with annular groove 66 in spool 56 for establishing the proper area for metering the required amount of fuel to the engine. The maximum travel of spool 56 may be governed by an adjustable stop (not shown) which serves to define the minimum area of window 64 exposed to annular groove 66 for establishing the minimum fuel flow to the engine. It is desirable to maintain the pressure drop across the throttle valve metering window 64 at a constant value. A pressure regulating valve for that purpose is shown schematically and indicated by numeral 68 (a suitable pressure control is shown in greater detail in the patent to S. Best, supra). The pressure regulating valve 68 may also have a fuel density adjustment 70 which consists of means for adjusting the spring force on the valve.

Rotating spool valves 48 and 72, are both positioned on employing the hydraulic wheatstone bridge principle. Any of the particular valves is held in position when the pressures acting on its two ends are in equilibrium. The metered pressure at either end is generated intermediate two effective orifice areas connecting the pressure supply line 90 and the drain line 76. The value of the metered pressure in either leg of the bridge depends on the level of the drain pressure and the supply pressure, and on the ratio of the upstream effective area to the downstream effective area. Since the drain pressure and supply pressure are common throughout, the metered pressures on the two ends of any valve will be equal when the effective orifice area ratios of the two legs generating the metered pressures are equal. Positioning of the aforementioned valves is thus seen to be accomplished by matching of effective area ratios in the appropriate computing legs, and is independent of pressure levels or absolute area sizes.

A bridge circuit can multiply a maximum of three variables, as is commonly known to those skilled in the art. The computation of fuel flow in this system requires the multiplication of four variables. The use of logarithms in the bridge circuits can extend the number of multiplications which can be made.

Hydraulic pressure generated between the fixed orifice 91, the variable orifice 78 (indicative of compressor inlet pressure), and the variable orifice 80 (indicative of actual fuel flow) is admitted into cylinder 62 to act on end 60 of spool 56. The area ratio of orifice 80 and orifice 78 to orifice 91 is thus indicative of the log of $W_f/\delta_1$. The compressor inlet pressure sensor is generally indicated by the numeral 82 and comprises bellows 84 having its free end suitably connected to lever 86. Pressure through sensing line 36 is admitted to act externally over bellows 84, which is evacuated internally. The force exerted by the bellows 84 on the spring 87 and on lever 86 will be indicative of the pressure at the compressor inlet so that the signal produced by movement of lever 86 is proportional to the pressure at the engine inlet. The free end of lever 86 cooperates with variable area 78 by rotating about pivot 88; the orifice 78 serves to define an area for admitting flow from line 90, through fixed restriction 91, into line 92 and to port 80 of the throttle valve 48 line 94. Line 92 transmits this pressure to end 60 of spool 56. The pressure of the fluid which is admitted via line 61, into cylinder 62 to act on end 58 of spool 56 is generated intermediate an effective orifice area pair whose area ratio is indicative of the log of the most amount of fuel flow ratio $W_f/\delta_1$, called for in comparing the log of fuel flow ratio $W_f/\delta_1$ called for by the deceleration circuit with the least log of fuel flow ratio $W_f/\delta_1$ called for among the acceleration circuits (turbine inlet temperature limit and compressor surge limit), the steady-state speed governing (hereinafter power-lever) circuit.

In order to more fully understand this invention, the functions of spool valves 72, 74, 96, and 98 and 100 and the speed sensor 122 will be described.

Valve 96 comprises spool 102 within housing 104 for defining the areas of the variable restrictions 106, 108, 110, 112 and 114. The position of the spool within the housing is determined by the compressor inlet temperature, $T_1$. Air at temperature $T_1$ enters housing 118 via sensing line 38 and passes over liquid filled bellows 120. The areas of the various restrictions 106, 108, 110, 112 and 114 are indicative of various functions of corrected compressor inlet temperature $\theta_1$ as will be explained hereinafter.

Power plant speed, N, is sensed by the speed sensor 122 which generates a pressure signal in line 124 which is proportional to the speed. This is accomplished by metering high pressure fluid from line 124 into line 126 via line 128. Fluid is metered into line 126 as a function of the position of the flyweight 130. The greater the speed, the more restricted is orifice 132 due to centrifugal force which forces the flyweight 130 radially outwardly. As the orifice 132 becomes more restricted the pressure in line 124, generated by flow from line 90 through fixed restriction 134, increases proportionately to the increase in speed. Fluid issuing from line 126 discharges into drain line 76.

Spool valve 74 is the $N/\sqrt{\theta}$ function generator. Since the area of the variable restriction 106 is defined as a function of $\theta_1$, namely, $\sqrt{\theta_1}$, and the pressure in line 124 is a function of power plant speed, the relationship of the ratio of fixed restriction 136 to the variable restriction 106 serves to create a pressure in line 138, the value of which is indicative of speed divided by the square root of power plant inlet temperature, i.e., $N/\sqrt{\theta_1}$, which is corrected speed. This pressure is fed, via line 140, to end 142 of spool 144 of valve 74 to urge the spool against the spring 146 acting on end 148 of the spool for defining the areas of variable restrictions 150, 152, 154, and 156 as functions of $N/\sqrt{\theta_1}$. Spool valve 100 is also a $N/\sqrt{\theta_1}$ function generator. While it is shown as an independent valve, it is actually another variable restriction on valve 74 but is shown separately for clarity of the drawing. The area of its variable restriction 156 is also defined as a function of $N/\sqrt{\theta_1}$; namely, $T_5/\theta_1 - a$, where $T_5$ is a constant equal to the maximum allowable turbine inlet temperature and $a$ is an arbitrary constant for purposes explained hereinafter.

Spool valve 98 is the regenerator outlet temperature ($T_4$) function generator. A remote temperature sensor, indicated generally by the numeral 158, senses the temperature of the regenerator outlet (burner inlet). The sensor may be of any type well known in the art, such as the type comprised of a quartz rod 160 in a metallic housing 162; the differential expansion of the housing 162 and the rod 160 provides a linear motion of the rod end 164 as a function of $T_4$. The motion is multiplied through a lever 166 to position the spool 168 in sleeve 170. In this manner the areas of variable restrictions 172 and 174 are defined as functions of temperature $T_4$.

Spool valve 72 is the $T_5/\theta_1 - T_4/\theta_1$ function generator. This function generator is used to bias acceleration surge limiting and power lever schedule. The areas of variable restrictions 178, 180 and 182 are defined as functions of $T_5/\theta_1 - T_4/\theta_1$ by the position of the spool 184 within sleeve 186. The spool 184 is positioned thusly: high pressure fluid from the line 90 flows to the drain line 76 after first flowing through fixed restriction 188, line 190 and variable restriction 108 in spool valve 96. Since the area of the restriction 108 is a function of $\theta_1$, as explained above, the pressure intermediate restrictions 188 and 108 is a function of $\theta_1$. This pressure is transmitted, via line 192 to end 194 of spool 184; high pressure fluid from line 90 also flows to the drain line 76 after first flowing through line 196, variable restriction 182 in valve 72, line 198, line 200, and variable restriction 174. The area of restriction 182 is defined as $$\left[a - \left(\frac{T_5}{\theta_1} - \frac{T_4}{\theta_1}\right)\right].$$

Line 200 also receives high pressure fluid from line 90 which fluid has first flowed through variable restriction 156, the area of which is defined as $T_5/\theta_1 - a$, and line 202. Thus it will be seen that the pressure in line 202 intermediate restriction 174 and restrictions 182 and 156 will be proportional to the ratio of the area of restriction 174 divided by the areas of restriction, 156 plus the area of restriction 182, namely, $$\frac{T_4}{\left[a - \left(\frac{T_5}{\theta_1} - \frac{T_4}{\theta_1}\right)\right] + \left[\frac{T_5}{\theta_1} - a\right]}.$$

This pressure is fed to end 204 of spool 184. It is obvious that spool 184 will be in equilibrium when the pressure on end 194 of spool 184 is equal to the pressure on end 204. The arbitrary constant $a$ is used as a mathematical expedient to avoid the need for creating negative areas. It is seen that the position of spool 184 is a function of $(T_5/\theta_1 - T_4/\theta_1)$.

The functions of the various valves and sensors having been described, attention will now be paid to the various $W_f/\delta_1$ fuel flow control circuits.

Surge limiting acceleration schedule

Surge of the compressor is prevented by scheduling $W_f$ in accordance with Equation 8

$$\frac{W_f}{\delta_1\sqrt{\theta_1}\left(\frac{T_5}{\theta_1} - \frac{T_4}{\theta_1}\right)} = f_1(N/\sqrt{\theta_1})$$

Figure 6:
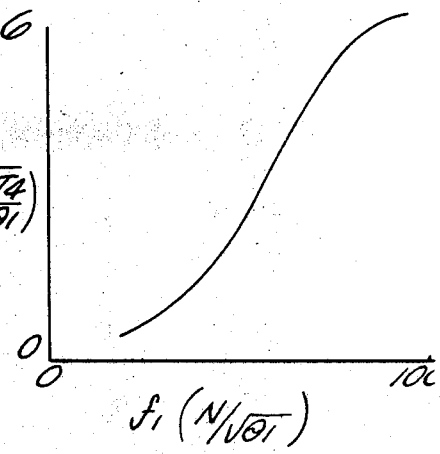
FIG. 6 is a graphical illustration of the relationship between the surge limiting acceleration parameter and corrected engine speed.
Figure 7:
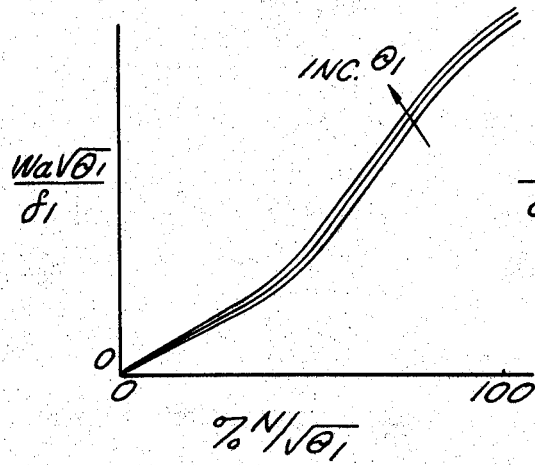
FIG. 7 is a graphical relationship between the corrected air flow and corrected engine speed for temperature limited acceleration.

Fluid discharged by the pump 30 flows to drain line 76 after first flowing through fixed restriction 206 in line 208; from restriction 206 fluid flows, via line 210, through variable restriction 114 in the valve 96 to drain line 76; the fluid likewise flows to drain line 76 from restriction 206 through line 211, line 212 and variable restriction 154 in the valve 74; and a third parallel path from restriction 206 is through line 211, line 214 and variable restriction 178 in the valve 72. When the surge limiting acceleration schedule is controlling, the fluid pressure intermediate the fixed restriction 206 and the three variable restrictions 114, 154 and 178 is transmitted to end 58 of the throttle valve 48 via line 216, computing means 218, line 219, computing means 220, line 221, computing means 224 and line 61. In order for the throttle valve to be in equilibrium, the following relationship must be true:

$$\frac{A_{114} + A_{154} + A_{178}}{A_{206}} = \frac{A_{78} + A_{80}}{A_{91}}$$

substituting the functions assigned to those areas by cutting the windows in the valve sleeves to provide those functions and by making $A_{206} = A_{91}$:

$$\log \sqrt{\theta_1} + \log f_1(N/\sqrt{\theta_1}) + \log \left(\frac{T_5}{\theta_1} - \frac{T_4}{\theta_1}\right) = \log W_f + \log \frac{1}{\delta_1}$$

taking anti-logs, noting (from FIG. 6) that $$f_1(N/\sqrt{\theta_1}) = \frac{W_f}{\delta_1\sqrt{\theta_1}\left(\frac{T_5}{\theta_1} - \frac{T_4}{\theta_1}\right)}$$

and rearranging:

$$W_f = \delta_1\sqrt{\theta_1}\left[\frac{W_f}{\delta_1\sqrt{\theta_1}\left(\frac{T_5}{\theta_1} - \frac{T_4}{\theta_1}\right)}\right]\left(\frac{T_5}{\theta_1} - \frac{T_4}{\theta_1}\right)$$

which provides the precise flow required for a surge limited acceleration. It is seen that the position of the throttle valve is proportional to the log of fuel flow, and it will be obvious to anyone skilled in the art that the log of fuel flow is converted to actual fuel flow by an anti-log contour of the throttle valve metering window 64.

Temperature limiting acceleration schedule

Overtemperature of the turbine inlet is prevented by scheduling $W_f$ in accordance with Equation 8

$$\frac{W_f \theta_1^y}{\delta_1(K_2 - T_4)} = f_2(N/\sqrt{\theta_1})$$

Figure 8:
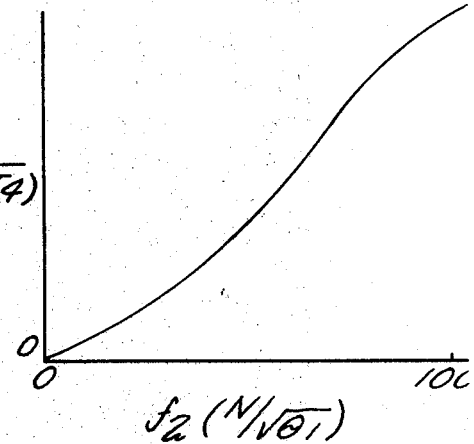
FIG. 8 is a graphical illustration of the relationship between the overtemperature limiting acceleration parameter and corrected engine speed.

Fluid discharged by the pump 30 flows to drain line 76 after first flowing through fixed restriction 226 in line 228; from restriction 226 fluid flows through three parallel paths to drain line 76: fluid flows through variable restriction 112 via line 230; fluid flows through variable restriction 152 via line 232 and line 234; and fluid flows through variable restriction 172 via line 232 and line 236. When the temperature limiting acceleration schedule is controlling, the fluid pressure intermediate the fixed restriction 226 and the three variable restrictions 112, 152 and 172 is transmitted to end 58 of the throttle valve 48 via line 238, computing means 218, line 219, computing means 220, line 221, computing means 224 and line 61. In order for the throttle valve 48 to be in equilibrium, the pressure on ends 58 and 60 of spool 56 must be equal, and, therefore, the following relationship must be true:

$$\frac{A_{112} + A_{152} + A_{172}}{A_{226}} = \frac{A_{78} + A_{80}}{A_{91}}$$

substituting the functions assigned to those areas by cutting their respective windows appropriately, and by making $A_{226} = A_{91}$:

$$\log \frac{1}{\theta_1^y} + \log f_2(N/\sqrt{\theta_1}) + \log (K_2 - T_4) = \log \frac{1}{\delta_1} + \log W_f$$

taking anti-logs, noting (from FIG. 8) that $$f_2(N/\sqrt{\theta_1}) = \frac{W_f \theta_1^y}{\delta_1(K_2 - T_4)}$$

and rearranging:

$$W_f = \frac{\delta_1}{\theta_1^y}\left[\frac{W_f \theta_1^y}{\delta_1(K_2 - T_4)}\right] \cdot (K_2 - T_4)$$

which provides the precise fuel flow required for a turbine inlet temperature limited acceleration.

Steady-state schedule—Power lever modulation

The power lever schedules $W_f/\delta_{1\text{desired}}$ as a function of PLA and combustion section temperature rise in accordance with the expression.

$$PLA = \frac{KW_f}{\delta_1\left(\frac{T_5}{\theta_1} - \frac{T_4}{\theta_1}\right)}$$

Fluid discharged by the pump 30 flows to drain line 76 after first flowing through fixed restriction 238 in line 240; from restriction 238 fluid flows to drain line 76 via three parallel paths: fluid flows through variable restriction 180 in the spool valve 72 via line 242; fluid flows through adjustable restriction 244 via line 246 and line 248; and fluid flows through adjustable restriction 250 and variable restriction 252 via line 254. The combination of the adjustable restriction 244, the adjustable restriction 250 and the variable restriction 252 (which is varied with power lever angle) results in an effective area which is proportional to $$\left[\frac{W_f}{\delta_1\left(\frac{T_5}{\theta_1}-\frac{T_4}{\theta_1}\right)}\right]_{desired}$$

The area of the variable restriction 180 is proportional to $$\left(\frac{T_5}{\theta_1}-\frac{T_4}{\theta_1}\right)$$

It is seen that the addition of $A_{180}+A_{244}+A_{250}+A_{252}$ is an effective area proportional to the log of $$\left(\frac{W_f}{\delta_1}\right)_{desired}$$

The pressure intermediate the above-mentioned effective area and fixed restriction 238 represents the value of the log of $$\left(\frac{W_f}{\delta_1}\right)_{desired}$$

computed by the power lever circuit and is a unique function of PLA and $$\left(\frac{T_5}{\theta_1}-\frac{T_4}{\theta_1}\right)$$

During power lever modulation, this pressure is fed to the end 58 of the pool of the throttle valve via line 256, computing means 220, line 221, computing means 224 and line 61. In order for the throttle valve 48 to be in equilibrium the following relationship must exist:

$$\frac{A_{180}+A_{eff}}{A_{238}}=\frac{A_{80}+A_{78}}{A_{91}}$$

substituting the functions assigned to those areas and by making $A_{238}=A_{91}$:

$$\log\left(\frac{T_5}{\theta_1}-\frac{T_4}{\theta_1}\right)+\log K(PLA)=\log W_f+\log\frac{1}{\delta_1}$$

taking anti-logs and rearranging:

$$W_f=\delta_1\left(\frac{T_5}{\theta_1}-\frac{T_4}{\theta_1}\right)K(PLA)$$

Since $$K(PLA)=\left[\frac{W_f}{\delta_1\left(\frac{T_5}{\theta_1}-\frac{T_4}{\theta_1}\right)}\right]_{desired}$$

$$W_f=\delta_1\left(\frac{T_5}{\theta_1}-\frac{T_4}{\theta_1}\right)\left[\frac{W_f}{\delta_1\left(\frac{T_5}{\theta_1}-\frac{T_4}{\theta_1}\right)}\right]_{desired}$$

It is seen that the throttle valve is, therefore, positioned until $$\frac{W_f}{\delta_1}\text{ actual}=\frac{W_f}{\delta_1}\text{ desired}$$

for power lever modulation.

The adjustable restriction 244 and the adjustable restriction 250 enable adjustment of high and low speed values of $W_f/\delta_1$ with a relatively high degree of independence. The power lever window 252 is set up at initial assembly so that it is just closed when the power lever is against the high speed stop. In this position the schedule can be trimmed to set the desired high speed schedule by adjusting restriction 244. After obtaining the proper high speed setting, the power lever is reduced to the idle position and idle is trimmed to the desired level by adjusting restriction 250. The setting of restriction 250 will have no effect on the high speed adjustment because the idle adjustment 250 is in series with the power lever window 252, which is closed at high speed setting.

Deceleration limiting

The deceleration limiting circuit schedules $$\left(\frac{W_f\theta_1^2}{\delta_1}\right)_{desired}$$

as a function of $N/\sqrt{\theta_1}$ and $\theta_1$. Fluid discharged by the pump 30 flows to the drain line 76 after first flowing through fixed restriction 270 in line 272; from restriction 270 fluid flows in two parallel paths to drain: fluid flows through variable restriction 110 in valve 96 via line 274; and fluid flows through variable restriction 150 in the valve 74 via line 276. The area of variable restriction 150, $A_{150}$, represents the desired deceleration schedule in the form $$\log\left(\frac{W_f\theta_1^2}{\delta_1}\right)_{desired}$$

The additive area of variable restriction 110, $A_{110}$, in parallel with restriction 150 is in the form of $$\log\frac{1}{\theta_1^2}$$

The addition of $A_{110}$ and $A_{150}$ is, therefore, an effective area, $A_{eff.}$, which is in the form $$\log\left(\frac{W_f}{\delta_1}\right)_{desired}$$

as follows:

$$A_{eff.}=A_{110}+A_{150}$$

$$A_{eff.}=\log\frac{1}{\theta_1^2}+\log\left(\frac{W_f\theta_1^2}{\delta_1}\right)_{desired}$$

$$A_{eff.}=\log\left(\frac{W_f}{\delta_1}\right)_{desired}$$

When the deceleration limiting circuit is controlling fuel flow, the fluid pressure intermediate fixed restriction 270 and variable restrictions 110 and 150 is transmitted to end 58 of the spool valve 48 via line 278, computing means 224 and line 61. In order for the throttle valve to be in equilibrium, the pressures on ends 58 and 60 of spool 56 must be equal, and, therefore, the following relationship must be true:

$$\frac{A_{eff.}}{A_{270}}=\frac{A_{80}+A_{78}}{A_{91}}$$

substituting the functions assigned to those areas by shaping their respective windows appropriately, and by making $A_{270}=A_{91}$:

$$\log\left(\frac{W_f}{\delta_1}\right)_{desired}=\log W_f+\log\left(\frac{1}{\delta_1}\right)$$

taking anti-logs and rearranging:

$$W_f=\delta_1\left(\frac{W_f}{\delta_1}\right)_{desired}$$

which provides the precise fuel flow required during deceleration. The following is a description of computing means, 218, 220, and 224. Computing means 218 is a least selector which selects the least fuel flow called for by the surge limiting acceleration circuit and the temperature limiting acceleration circuit. The least signal is fed, via line 219, to computing means 220, another least selector, which selects the least fuel flow called for by computing means 218 and the power lever modulation circuit. The least signal computed by computing means 220 is fed, via line 221, to computing means 224. Computing means 224 is a most selector, which selects the most fuel called for by computing means 220 as compared with the signal fed to computing means 224 by the deceleration limiting circuit. The most fuel flow signal selected by computing means 224 is fed, via line 61, to end 58 of the spool 56 of the throttle valve 48. The valve indicated generally by the numeral 280 is a minimum pressurizing and shut-off valve. High pressure fluid discharged by the pump 30 is fed to fixed restriction 282 via line 284 and thence to a valve 286 operated by the power lever. When the shut-off position of the power lever is selected, fluid from restriction 282 flows through the valve 286 to the shut-off valve 280, via line 288, thereby blocking fuel flow to the engine.

There has thus been described a preferred embodiment of a fuel control in accordance with the present invention. It should be understood by those skilled in the art that various changes and omissions in the form and detail thereof may be made therein without departing from the spirit and scope of the invention.

What we claim as new and desire to secure by Letters Patent of the United States is:

1. For a regenerative type gas turbine engine having a compressor, a combustion section, a turbine driven by the exhaust gases of the combustion section for driving the compressor, a regenerator for recovering heat from the exhaust gases of the turbine and transferring the heat to the compressor exhaust gases prior to the entry of the gases into the combustion section, a source of fuel under pressure and connection means for interconnecting the source of fuel and the combustion section, a fuel control for delivery of fuel to the combustion section, comprising:

fuel regulating means disposed in the connection means for regulating the flow of fuel therein; and controlling means responsive to power plant speed, compressor inlet temperature, compressor inlet pressure and combustion section inlet temperature for controlling said fuel regulating means including:

first computing means for limiting the temperature of the gases at the turbine inlet by establishing a scheduled value for satisfying a first expression $$\frac{W_f \theta_1{}^y}{\delta_1 (K_2 - T_4)}$$

varying as a function of $N/\sqrt{\theta_1}$, where:

$W_f$ = fuel flow;
$\theta_1{}^y$ = function of corrected compressor inlet temperature;
$\delta_1$ = corrected compressor inlet pressure;
$K_2$ = maximum allowable turbine inlet temperature; and
$T_4$ = actual regenerator outlet (combustion section inlet side) temperature;

said first computing means establishing said first expression by comparing one set of engine conditions with another set of engine conditions;

second computing means within said controlling means for preventing surge at the compressor by establishing a scheduled value for satisfying a second expression $$\frac{W_f}{\delta_1 \sqrt{\theta_1} \left( \frac{T_5}{\theta_1} - \frac{T_4}{\theta_1} \right)}$$

varying as a function of $N/\sqrt{\theta_1}$, where:

$\theta_1$ = corrected compressor inlet temperature; and
$T_5$ = desired turbine inlet temperature; and third means within said controlling means for comparing the fuel flows called for by said first computing means and said second computing means, selecting the lower of the fuel flows, and controlling said fuel regulating means so that the lower of the fuel flows is delivered to the combustion section.

2. For a turbine type power plant having a compressor, a combustion section, a turbine driven by the exhaust gases of the combustion section for driving the compressor, a power lever, a source of fuel under pressure and connection means for interconnecting the source of fuel and the combustion section, a fuel control for scheduling the steady-state and acceleration operation of the power plant comprising:

fuel regulating means disposed in the connection means and movable therein for regulating the flow of fuel therethrough; said fuel regulating means being movable in response to a signal generated by a first computing means, said first computing means selecting the lower of the two fuel flows as computed by a steady-state operation computing means, which computes a fuel flow in response to combustion section temperature rise, compressor inlet pressure and power lever setting, and as computed by an acceleration operation computing means, which computes a fuel flow in response to power plant speed, compressor inlet temperature, compressor inlet pressure and combustion section inlet temperature by deriving a first output signal by comparing some of the above parameters with others of the parameters and then comparing said first output signal with a second output signal derived from said parameters.

3. For a turbine type power plant having a compressor, a combustion section, a turbine driven by the exhaust gases of the combustion section for driving the compressor, a power lever, a source of fuel under pressure, and connection means for inter-connecting the source of fuel and the combustion section, a fuel control for delivering fuel to the combustion section, comprising:

fuel regulating means disposed in the connection means for regulating the flow of fuel therein, including computing means for computing the fuel flow for acceleration of the power plant within the surge limit and within the temperature limit, said computing means being responsive to the speed of the power plant, the compressor inlet temperature, the compressor inlet pressure and the combustion section inlet temperature.

said computing means deriving a first output signal by comparing some of the above parameters with others of the parameters, said computing means then comparing said first output signal with a second signal derived from said parameters, and selecting the lowest of the two fuel flow value signals as computed from the temperature limit and the surge limit for controlling said fuel regulating means.

4. A fuel control for delivering fuel to the combustion section of a turbine type power plant as claimed in claim 3, wherein said computing means derives said first signal for limiting the temperature of the gases at the turbine inlet by establishing a scheduled value for satisfying the expression $$\frac{W_f \theta_1{}^y}{\delta_1 (K_2 - T_4)}$$

varying as a function of $N/\sqrt{\theta_1}$, where:

$W_f$ = fuel flow;
$\theta_1{}^y$ = function of corrected compressor inlet temperature;
$\delta_1$ = corrected compressor inlet pressure;
$K_2$ = maximum allowable turbine inlet temperature;
$T_4$ = actual combustion section inlet temperature;
$N$ = speed of the power plant; and
$\theta_1$ = corrected compressor inlet temperature.

5. A fuel control for delivering fuel to the combustion section of a turbine type power plant as claimed in claim 3, wherein said computing means derives said first signal for preventing surge at the compressor by establishing a scheduled value for satisfying the expression $$\frac{W_f}{\delta_1 \sqrt{\theta_1} \left( \frac{T_5}{\theta_1} - \frac{T_4}{\theta_1} \right)}$$

varying as a function of $N/\sqrt{\theta_1}$, where:
- $W_f$ = fuel flow;
- $\delta_1$ = corrected compressor inlet pressure;
- $\theta_1$ = corrected compressor inlet temperature;
- $T_4$ = actual combustion section inlet temperature;
- $T_5$ = desired turbine inlet temperature; and
- $N$ = speed of the power plant.

6. A fuel control as claimed in claim 3, wherein said computing means comprises:

first means within said controlling means for deriving said first output signal for limiting the temperature of the gases at the turbine inlet by establishing a scheduled value for satisfying a first expression $$\frac{W_f \theta_1^y}{\delta_1 (K_2 - T_4)}$$

varying as a function of $N/\sqrt{\theta_1}$, where:
- $W_f$ = fuel flow;
- $\theta_1^y$ = function of corrected compressor inlet temperature;
- $\delta_1$ = corrected compressor inlet pressure;
- $K_2$ = maximum allowable turbine inlet temperature; and
- $T_4$ = actual combustion section inlet temperature;

second means within said controlling means for deriving said second signal for preventing surge at the compressor by establishing a scheduled value for satisfying a second expression $$\frac{W_f}{\delta_1 \sqrt{\theta_1} \left( \frac{T_5}{\theta_1} - \frac{T_4}{\theta_1} \right)}$$

varying as a function of $N/\sqrt{\theta_1}$, where:
- $\theta_1$ = corrected compressor inlet temperature and
- $T_5$ = desired turbine inlet temperature; and third means within said controlling means for comparing the fuel flows called for by said first means with the fuel flow called for by said second means, selecting the lower of the fuel flows, and controlling said fuel regulating means so that the lower of the fuel flows is delivered to the combustion section.

7. A fuel control as claimed in claim 6, additionally comprising:

fourth means within said controlling means for establishing a scheduled value for satisfying a third expression.

$$\frac{W_f}{K \delta_1 \left( \frac{T_5}{\theta_1} - \frac{T_4}{\theta_1} \right)}$$

varying as a function of the power lever angle, where:
- $K$ = a constant; and $$\left( \frac{T_5}{\theta_1} - \frac{T_4}{\theta_1} \right)$$

= the combustion section temperature rise; and fifth means within said controlling means for comparing the fuel flow called for by said third means with the fuel flow called for by said fourth means, selecting the lower of the fuel flows, and controlling said fuel regulating means so that the lower of the fuel flows is delivered to the combustion chamber.

8. A fuel control as claimed in claim 7, additionally comprising:

sixth means within said controlling means for establishing a scheduled value for satisfying a fourth expression $$\frac{W_f \theta_1^z}{\delta_1}$$

varying as a function of $N/\sqrt{\theta_1}$, where:

- $\theta_1^z$ = a function of corrected compressor inlet temperature; and seventh means within said controlling means for comparing the fuel flow called for by said fifth means with the fuel flow called for by said sixth means, selecting the greater of the fuel flows, and controlling said fuel regulating means so that the greater of the fuel flows is delivered to the combustion section.

References Cited

UNITED STATES PATENTS

| | | | |
|---|---|---|---|
| 2,970,436 | 2/1961 | Sims | 60—39.28 |
| 2,971,339 | 2/1961 | Gold | 60—39.28 |
| 2,946,189 | 7/1960 | Basford | 60—39.28 |
| 3,023,801 | 3/1962 | Kinney | 60—39.28 XR |
| 3,166,902 | 1/1965 | Maljanian | 60—39.28 XR |
| 3,243,957 | 4/1966 | Mansfield | 60—39.28 |
| 3,306,037 | 2/1967 | Fortmann | 60—39.28 |
| 3,316,713 | 5/1967 | Urban | 60—39.28 |

MARK M. NEWMAN, Primary Examiner

U.S. Cl. X.R.

60—39.16, 39.51